3,400,005
METHOD OF MAKING A DECORATIVE SURFACE COVERING HAVING AN EMBOSSED EFFECT
Robert P. Desch, East Hempfield Township, Lancaster County, Pa., and James F. Harbison, Lititz, Pa., assignors to Armstrong Cork Company, Lancaster, Pa., a corporation of Pennsylvania
Filed Oct. 7, 1963, Ser. No. 314,476
7 Claims. (Cl. 117—9)

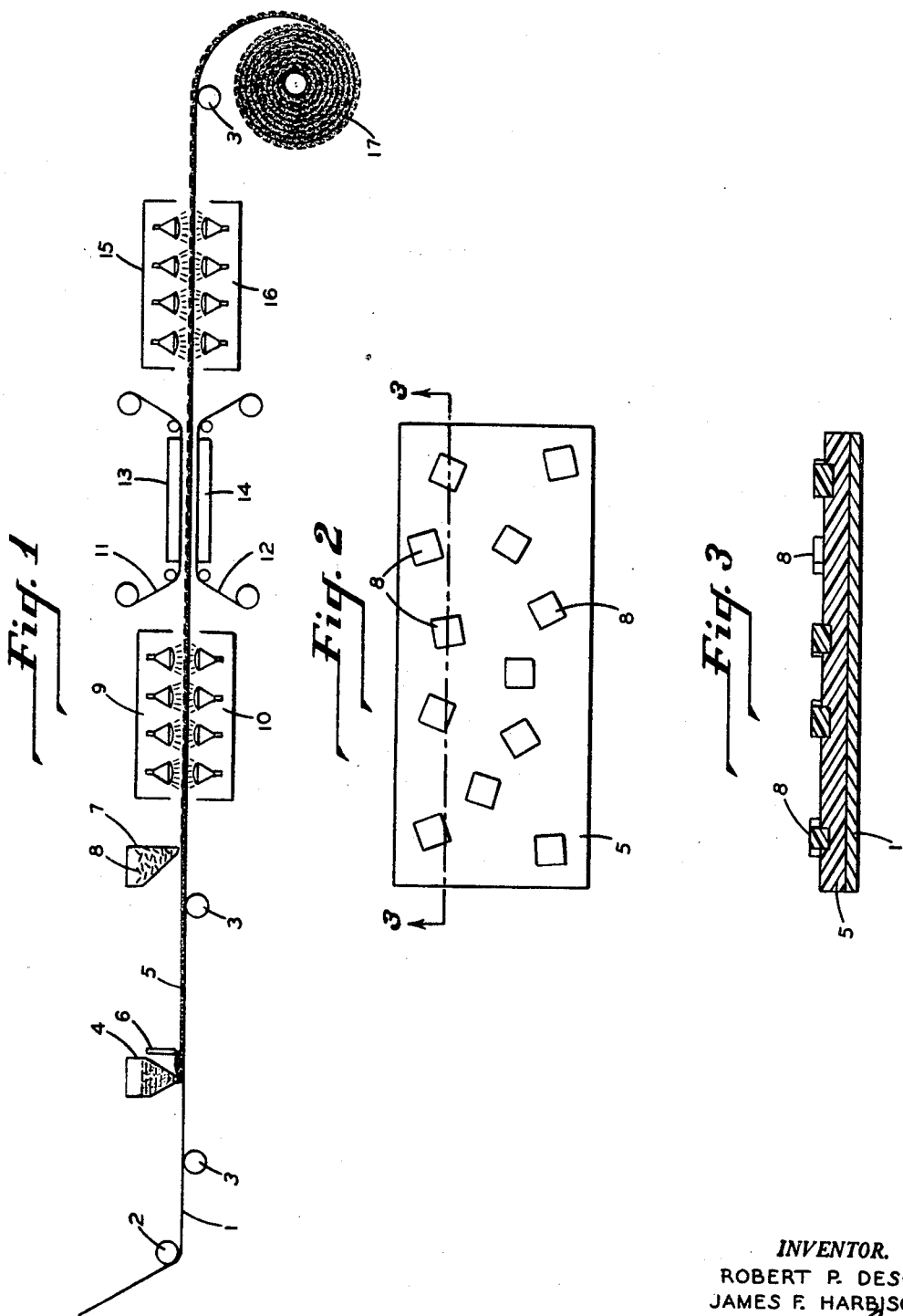

ABSTRACT OF THE DISCLOSURE

Flat preformed pieces of fused thermoplastic polyvinyl resin composition are disposed on an organosol layer, the organosol fused, and the chips and organosol layer consolidated to form a smooth surface sheet in which the chips are embedded. The smooth fused sheet is then heated to stress relax the consolidated organosol, the chips, on the relaxation of the organosol, being allowed to raise above the surface of the sheet to achieve an embossed appearance.

---

This invention relates to a method of making decorative surface coverings for floors, walls, and the like. More particularly, this invention relates to a method for producing a decorative surface covering having an embossed effect from a base sheet of clear or colored thermoplastic vinyl resin composition having design elements comprised of a plurality of preformed flat pieces of thermoplastic vinyl resin composition of contrasted color pressed therein.

Many methods of producing multi-colored decorative thermoplastic vinyl resin sheeting materials for use as floor coverings, wall coverings, and the like, have been devised in recent years. Particularly attractive effects have been realized by using preformed flat pieces or chips of contrasting coloration as the design elements which are pressed or inlaid in such surface coverings. Depending upon the compositions used and techniques developed, decorative surface coverings of striking effects have been realized.

Methods incorporating the use of a base sheet of a plasticized thermoplastic vinyl resin as the background and employing the technique of positioning flat pieces or chips of contrasting coloration on the surface of the base sheet, heating the base sheet to a temperature at which the surface is readily deformable, and pressing the chips or flat pieces into the surface of the sheet while said surface is deformable to reform a smooth surface floor covering have been devised. When it is desirable to emboss such surface coverings to form further striking effects, it has been necessary to employ embossing rolls and a careful control of the placement of the design elements when embossing in register with said elements. The present invention encompasses a novel technique for producing an embossed effect in a surface covering wherein design elements comprised of a plurality of preformed flat pieces of thermoplastic vinyl resin composition are inlaid in a base sheet of clear or colored thermoplastic vinyl resin composition of contrasting coloration, the base sheet forming valleys between the elevated design elements. The invention facilitates the production of materials having embossed effects insofar as the necessity of embossing equipment and close registry control are eliminated. In addition, embossed effects in extremely thin gauge sheet goods are readily accomplished.

The process of this invention can be utilized to produce decorative surface coverings having embossed effects in a wide variety of designs, including random and non-repetitive designs.

According to the present invention, decorative thermoplastic surface coverings are produced by depositing a base layer of a liquid organosol vinyl resin composition onto a suitable carrier material so as to form a liquid matrix material on which design elements can be readily positioned. The carrier may be uncoated or coated with a pigmented base coat if desired, such as when a clear or substantially transparent organosol layer is utilized. After the liquid organosol matrix layer is deposited on the carrier material, the coated carrier is passed beneath a suitable feeder which distributes and positions a plurality of flat pieces or chips of contrasting coloration formed from a thermoplastic vinyl resin composition. At this point, the coated carrier carrying the chips of contrasting color is fused and the whole is passed beneath a consolidating platen to embed the chips of contrasting coloration into the fused organosol matrix layer so as to form a smooth surface decorative surface covering having design elements pressed therein. If desired, the decorative surface coverings may be coated with a transparent coating at this time. The smooth surface decorative surface covering having the design elements pressed therein is then heated to between about 280° F. and 350° F. to relax the matrix material, the design elements at this stage raising to a degree such that the product, on cooling, has an embossed effect.

In order that the invention may be readily understood, certain embodiments of the method will be described in conjunction with the attached drawing, in which:

FIGURE 1 is a diagrammatic view showing one method of making the surface covering;

FIGURE 2 is a plan view of a piece of a flexible, smooth surface covering illustrating certain of the effects that may be produced according to certain of the embodiments of this invention; and FIGURE 3 is a sectional view taken along the line 3–3 of FIGURE 2 showing the embossed effect achieved through the practice of this invention.

Referring to the drawing, the backing layer 1, which may be coated with a pigmented base coat if desired, is fed from a suitable source not shown, such as a roll. For purposes of illustration, the backing may be a beater saturated asbestos fiber felt such as disclosed in Feigley Patent 2,759,813, issued Aug. 21, 1956. This backing may be about 75" wide, about .039" thick, and of indefinite length. The upper face of the backing layer in this embodiment carries the pigmented base coat which in this instance is formed from an organosol coating of the following composition:

Pigmented base coat

| Ingredient: | Parts by weight |
|---|---|
| Dispersion grade polyvinyl chloride homopolymer resin having a specific viscosity [1] of 1.8 (Diamond Alkali PVC–7103) | 100 |
| Epoxidized soybean oil | 5 |
| Di-2-ethyl hexyl phthalate | 30 |
| Polyethylene glycol monolaurate (polyethylene glycol 200 monolaurate) | 2 |
| Barium-cadmium laurate stabilizer | 4.8 |
| Calcium carbonate | 100 |
| Rutile titanium dioxide pigment | 5 |
| Mineral spirits | 9 |
| Aromatic hydrocarbon solvent mixture (Solvesso 150) | 3 |

[1] Determined on a 1% resin solution in cyclohexanone at 30° C.

The base coated backing 1 is fed over rolls 2 and 3 and beneath a suitable feeding unit 4 containing a liquid organosol of the following composition:

Organosol clear coat

| Ingredient: | Parts by weight |
|---|---|
| Dispersion grade polyvinyl chloride homopolymer resin (Diamond Alkali PVC–7103) | 100 |
| Epoxidized soybean oil | 5 |
| Di-2-ethyl hexyl phthalate | 25 |
| Polyethylene glycol 200 monolaurate | 2 |
| Stabilizer—Barium-cadmium laurate | 3 |
| Mineral spirits | 7.5 |
| Solvesso 150 | 2.5 |

The organosol coating is doctored, by means of a suitable doctoring blade 6, onto the backing as a 4 mil thick layer 5.

Chip or particle composition

| Ingredient: | Parts by weight |
|---|---|
| Dispersion grade polyvinyl chloride homopolymer resin (Diamond Alkali PVC–7103) | 100 |
| Epoxidized soybean oil | 5 |
| Di-octyl phthalate | 50 |
| Polyethylene glycol 200 monolaurate | 2 |
| Barium-cadmium laurate | 4.8 |
| Brown iron-oxide pigment | 1 |
| Rutile titanium dioxide pigment | 5 |

The chips or preformed flat pieces are formed by initially doctoring a layer of the above composition onto a steel belt, fusing at about 325° F. to 350° F. to form a strippable film and then breaking up the film into flat particles as, for instance, by running the film through a Fitz-mill.

The feeder 7 feeds the chips 8, about 4 mils thick formed from the above composition, onto the backing carrying the liquid organosol layer 5 and the backing carrying the liquid organosol layer with the chips disposed therein is fed between banks 9 and 10 of infrared heaters which heat the liquid organosol to about 350° F. to fuse the vinyl resin. The backing having the fused organosol coating deposited thereon is then fed between platens 13 and 14, the upper platen 13 being heated to a temperature of about 310° F. and the lower press platen 14 being at about 75° F. or room temperature. Release paper 11 and 12 is utilized between the press platen surfaces and the resilient surface covering and a pressure of about 2,000 pounds per square inch is applied to form a smooth surface covering material. This smooth surface covering material is then fed between two banks of infrared heaters 15 and 16 where it is heated to a temperature of between 280° F. to 350° F. which causes the fused organosol matrix material to relax to an extent sufficient to allow the inlaid design elements to raise above the surface of the sheet. The resilient surface covering having the embossed effect is then cooled and passed to a windup roll 17.

FIGURE 2 is a top plan view of the resilient surface covering produced in accordance with this invention, showing the design elements 8 inlaid in the fused organosol layer 5.

FIGURE 3 is a cross-sectional view taken along the line 3—3 of FIGURE 2 and shows the manner in which the design elements 8 protrude from the surface of the organosol layer 5 in the heat relaxed product, thus achieving the embossed effect in the finished product.

Based on 100 parts by weight of a dispersion grade thermoplastic vinyl resin which could be a polyvinyl chloride homopolymer or copolymer, from 15 to less than 50 parts by weight and preferably 20 to 30 parts by weight of a liquid vinyl plasticizer and from 0 to 100 parts by weight of filler and pigment may be used to form the liquid organosol coating. In forming the liquid organosol coating, sufficient diluent is added to give a liquid system having the desired viscosity of from about 1,000 to 5,000 centipoises (measured with a Brookfield viscosimeter) so as to form a liquid system which readily coats the carrier sheet.

Preferably the flat pieces or particles of contrasting coloration are formed from, based on 100 parts by weight of a thermoplastic dispersion grade vinyl resin, of from 15 to 150 parts by weight of plasticizer, 0 to 25 parts by weight of diluent, and from 0 to 100 parts by weight of filler and pigment. Polyvinyl chloride homopolymers and copolymers are suitable although chips made from calendered films may be used in place of the chips based on dispersion grade resins. When the dispersion grade resin containing composition is used, the composition is preferably initially coated onto a releasable or strippable carrier such as a steel belt and fused at from 325° F. to 350° F. to form a sheet of fused vinyl composition, the fused sheet being from 1 to 20 mils thick, and this sheet is then broken up into chips of the desired configuration.

We claim:
1. A method of making a decorative surface covering for floors, walls, or the like comprising
   (A) coating a carrier sheet with a liquid organosol layer,
   (B) disposing on said organosol layer a plurality of substantially flat, preformed pieces of fused thermoplastic polyvinyl resin composition of contrasting color,
   (C) fusing said liquid organosol layer,
   (D) pressing said flat pieces flatwise into said fused organosol layer to form a smooth surface sheet having the exposed surfaces of said pieces substantially flush with the surface of said sheet, and
   (E) heating the sheet for a period of time sufficient to relax the organosol layer and to allow the flat, preformed pieces of fused polyvinyl composition to raise above the surface of the sheet to form a finished sheet having an embossed appearance.

2. A method in accordance with claim 1 in which the preformed pieces are disposed on said organosol layer in substantially spaced relationship.

3. The method in accordance with claim 1 in which the liquid organosol layer is formed from, in relative proportions, 100 parts by weight of a dispersion grade thermoplastic vinyl resin, from 15 to less than 50 parts by weight of a liquid plasticizer, sufficient diluent to give a liquid system having a viscosity of from about 1,000 to 5,000 centipoises, and from 0 to 100 parts by weight of filler and pigment.

4. The method in accordance with claim 3 in which the liquid organosol contains from 20 to 30 parts by weight of a liquid plasticizer.

5. The method in accordance with claim 3 in which the liquid organosol layer is fused at a temperature of from about 325° F. to 350° F. and in which the pressed sheet is heated at a temperature of from about 280° F. to 350° F. for a period of time sufficient to relax the organosol layer and to allow the flat, preformed pieces of fused polyvinyl composition to rise above the surface of the sheet.

6. A method in accordance with claim 1 in which the liquid organosol layer is formed from, in relative proportions, 100 parts by weight of a dispersion grade thermoplastic vinyl resin and from 20 to 30 parts by weight of a liquid plasticizer and sufficient diluents to give a liquid system having a viscosity of from about 1,000 to 5,000 centipoises.

7. A method in accordance with claim 6 in which the liquid organosol layer is fused at a temperature of from about 325° F. to 350° F. and in which the pressed sheet is heated at a temperature of from about 280° F. to 350° F. for a period of time sufficient to relax the organosol layer and to allow the flat, preformed pieces of fused polyvinyl composition to rise above the surface of the sheet.

References Cited
UNITED STATES PATENTS

| | | | |
|---|---|---|---|
| 3,000,754 | 9/1961 | Zentymer | 117—25 X |
| 3,152,002 | 10/1964 | Wisotzky et al. | 117—25 X |

WILLIAM D. MARTIN, *Primary Examiner.*

P. F. ATTAGUILE, *Assistant Examiner.*